United States Patent [19]
Newton, Jr.

[11] Patent Number: 5,165,673
[45] Date of Patent: Nov. 24, 1992

[54] FLY TYING LATHE

[76] Inventor: Brewster L. Newton, Jr., 63 Warren St., Upton, Mass. 01568

[21] Appl. No.: 788,180

[22] Filed: Nov. 5, 1991

[51] Int. Cl.⁵ ............................................. B25B 1/22
[52] U.S. Cl. .................................... 269/69; 269/71; 269/97
[58] Field of Search ............... 43/1; 242/7.01; 269/71, 269/69, 907, 95, 97, 98, 166, 229, 234; 279/41 R; 294/100; 81/6, 7, 8

[56] References Cited

U.S. PATENT DOCUMENTS

| | | | |
|---|---|---|---|
| 52,983 | 3/1866 | Floyd | 269/166 |
| 1,869,857 | 8/1932 | Meyer | |
| 2,489,547 | 11/1949 | Temple | |
| 2,586,636 | 2/1952 | Fischer et al. | 269/97 |
| 4,094,497 | 6/1978 | Stratton | 269/97 |
| 4,119,305 | 10/1978 | Anderson | |
| 4,134,577 | 1/1979 | Price et al. | 269/71 |
| 4,169,562 | 10/1979 | Renzetti | 269/97 |
| 4,322,065 | 3/1982 | Doiron | |
| 4,375,284 | 3/1983 | Doiron | |
| 4,502,457 | 3/1985 | Marron | 269/71 |
| 4,508,328 | 4/1985 | Kujima | |
| 4,544,145 | 10/1985 | Norlander | |
| 4,744,552 | 5/1988 | Glaser | 269/71 |
| 4,969,636 | 11/1990 | Gautam | |

Primary Examiner—Robert C. Watson
Attorney, Agent, or Firm—Blodgett & Blodgett

[57] ABSTRACT

A fly tying vise utilizing a rotatable sleeve and chuck for preparing and tying a fly. An engagement pin which allows a user to either close and open the jaws of the chuck or to rotate the fly in the chuck.

12 Claims, 11 Drawing Sheets

FLY TYING LATHE

BACKGROUND OF THE INVENTION

A. Field of the Invention:

The present invention relates to a rotatable vise for holding small objects. It is particularly useful for holding fishhooks while tying artificial flies and other lures. The use of artificial flies for fish lures apparently dates back centuries. Essentially, fishermen like to prepare their own flies by using various threads, feathers and the like, sometimes called dressing. The construction of flies plays an integral part in the fly fishing sport. This is true since a variety of fish, such as trout, will vary their feeding patterns and require a fisherman to design an artificial fly to suit the appetite of the fish. A basic and essential need in the process of fly construction is the ability to hold the hook in a rigid and specifically desired position while applying the dressing.

B. Pertinent Art:

Attention is called to the U.S. Pat. Nos. 1,869,857 (Meyers); 2,489,547 (Temple); 4,119,305 (Anderson); 4,322,065 (Doiron); 4,375,284 (Doiron); 4,508,328 (Kujma); 4,544,145 (Norlander); 4,964,636 (Gautam).

C. Setting of the Invention:

One of the difficulties in designing a good fly tying vise lies in the ability of the vise to rigidly hold a hook in a desired position while the dressing is being applied. Until one studies the requirements which must be met, it would seem that a fly-tying vise would be an easy piece of equipment to design. This is not so, and is well attested to by the variety of vise designs available for the professional or recreational fly-tier.

A second problem in designing a fly tying vise is ease of use. Generally, a fisherman or other user would be required to use both hands when clamping the hook into its place for dressing. He would use one hand to hold the hook precisely in the desired orientation and use the other hand to operate the clamping action of the vise to grasp the hook. Unfortunately conventional clamping methods do not function optimally when only one hand is available as in the fly tying situation. When conventional clamping mechanisms for fly tying are operated with one hand, the action is imprecise and awkward.

These and other difficulties experienced with the prior art devices have been obviated in a novel manner by the present invention.

D. Objects of the Invention:

Accordingly, it is an object of the present invention to provide a rotatable vise.

A further object is to provide a vise which opens and closes its jaws by means of a rotating hub.

Still another object is to provide a vise which a user can single-handedly provide a torque to a fishhook shaft or open and close the jaws of the vise, with precision, ease, and predictability.

Another object is to provide a well crafted rotatable vise which will allow adjustments in all modes of motion.

A further object is to provide a means for tying a fishing fly.

A still further object is to provide a pair of jaws which will securely hold fishing hooks of a wide range of size.

With these and other objects in view, as will be apparent to those skilled in the art, the invention resides in the combination of parts set forth in the specification and covered by the claims appended hereto.

E. Summary of the Invention:

This invention is a rotatable vise for holding small objects. The vise comprises a mounting means for attaching the vise to a fixed support, such as a bench top. A body is attached to the mounting means. A freely rotatable sleeve or spindle is mounted in the body with said sleeve having a longitudinal axis about which the sleeve is rotatable. A rotator or rotatable hub is rotatably mounted on one end of the rotatable sleeve and adjacent to the body. The hub is fixed to a draw bar rotatably mounted in the rotatable sleeve so that when the hub is rotated, the draw bar will also rotate. The rotator is normally a hub with a crank handle near its periphery. A sleeve engagement means is associated with the rotatable sleeve and comprises a fixed pin mounted on the body. When the pin is screwed inward, the pin engages a detent in the rotatable sleeve so that the rotatable sleeve will not rotate in the body. When the fixed pin is screwed outward, the sleeve and hub will rotate in the same direction as if they were locked together. As will be described below, however, they are not locked actually together.

The rotator is actually locked to a draw bar, which is mounted in the sleeve for rotation about the axis of the sleeve. Also mounted in the sleeve at the end of the sleeve opposite the rotator is the object clamping means. The object clamping means is mounted in the sleeve for axial movement relative to the sleeve, but not rotation relative to the sleeve. The object clamping means has a gripper, a first actuating surface, and a draw element. The gripper is adapted to selectively firmly hold the work piece, e.g., a fish hook. The actuating surface cooperates with a second actuating surface on the sleeve to actuate the gripper. The draw element is threadedly attached to the draw bar so that relative rotation between the draw bar and the draw element causes axial movement of the gripper, and thereby actuation of the gripper. This action imparts a rotational torque to the sleeve which may or may not rotate depending on the position of the pin.

CHARACTERIZATION OF THE DRAWINGS

The character of the invention, however, may best be understood by reference to one of its structural forms, as illustrated by the accompanying drawings, in which:

FIG. 1 is a front elevation view of a fly tying vise embodying the principles of the present invention, FIG. 2 is a plan view of the vise shown in FIG. 1, FIG. 3 is a right side view of the vise shown in FIG. 1, FIG. 4 is a bottom view of the vice shown in FIG. 1, FIG. 5 is a left side view of the vise shown in FIG. 1, FIG. 6 is a rear elevation view of the vise shown in FIG. 1, FIG. 7 is a front elevation view of the vise shown in FIG. 1, as it would be attached to a work bench, FIG. 8 is a cross-sectional front elevational view of the vise shown in FIG. 1, taken along line VIII—VIII of FIG. 2, FIG. 9 is a cross-sectional view of an attitude adjustment means, taken along line IX—IX of FIG. 6, FIG. 10 is a close-up of the upper portion of FIG. 8, FIG. 11 is a view of the back of the chuck, FIG. 12 is a cross-sectional view taken along line XII—XII of FIG. 1, FIG. 13 is a diagrammatic top view of the open chuck and sectioned spindle and draw bar, FIG. 14 is a right side view of the open chuck, FIG. 15 is a diagrammatic top view of the closed chuck and sectioned spindle and draw bar, FIG. 16 is a right side view of the closed chuck, FIG. 17 is a diagrammatic front elevation view of the vise in its clamping mode, FIG. 18 is a diagrammatic front elevation view of the vise in its rotating mode, with the workpiece started, FIG. 19 is a diagrammatic front elevation view of the vise in its rotating mode, with the workpiece progressing, FIG. 20 is a cross-sectional view of the face of the rear jaw taken along line XX—XX of FIG. 15, showing the positioning of a small and a large hook, FIG. 21 is a front elevation view of the vise shown in FIG. 17, with the bobbin rest in its operative position, and FIG. 22 is a plan view of the vise shown in FIG. 21.

DETAILED DESCRIPTION OF THE INVENTION

Figure 1:
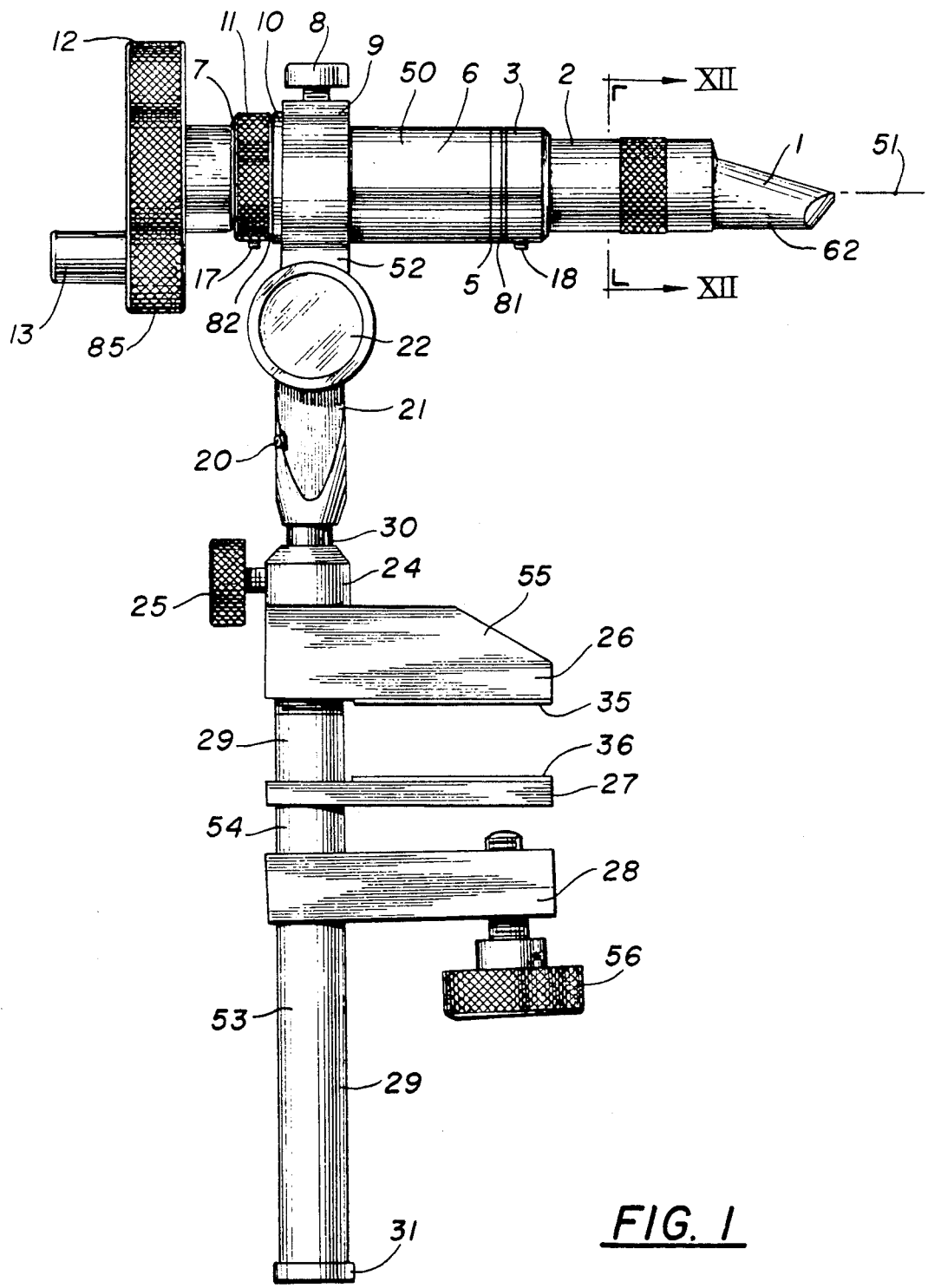
Figure 2:
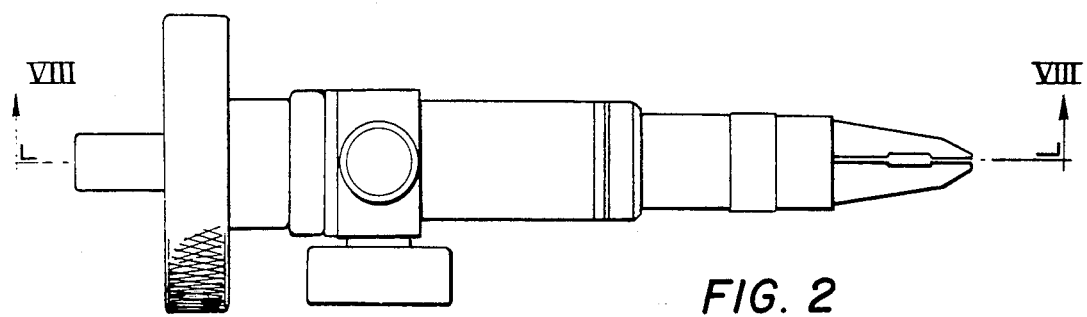
Figure 3:
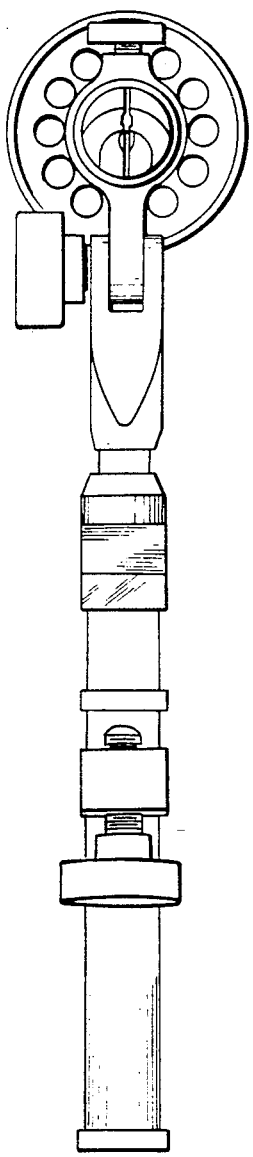
Figure 4:
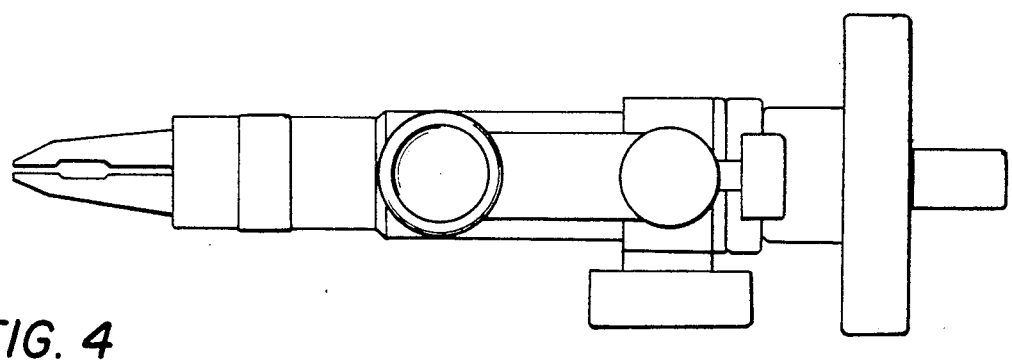
Figure 5:
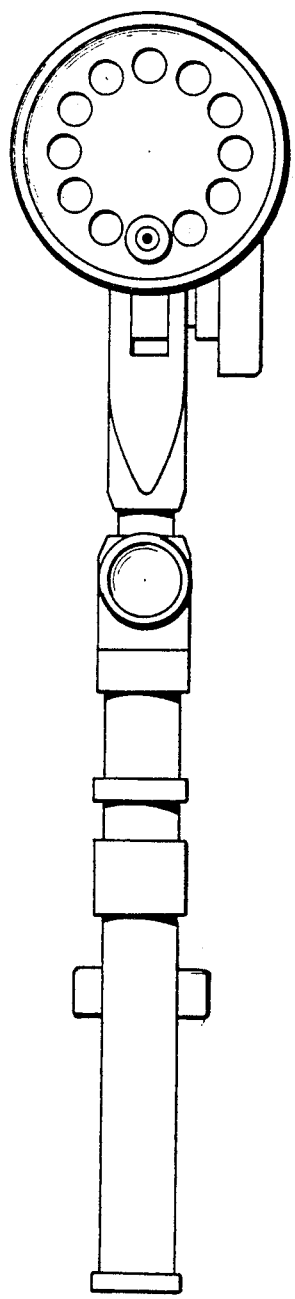
Figure 6:
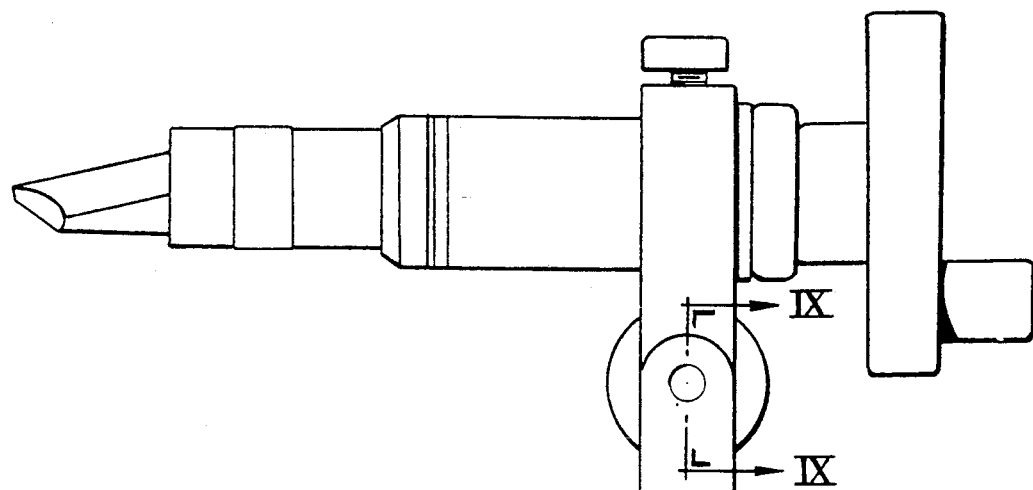
Figure 6:
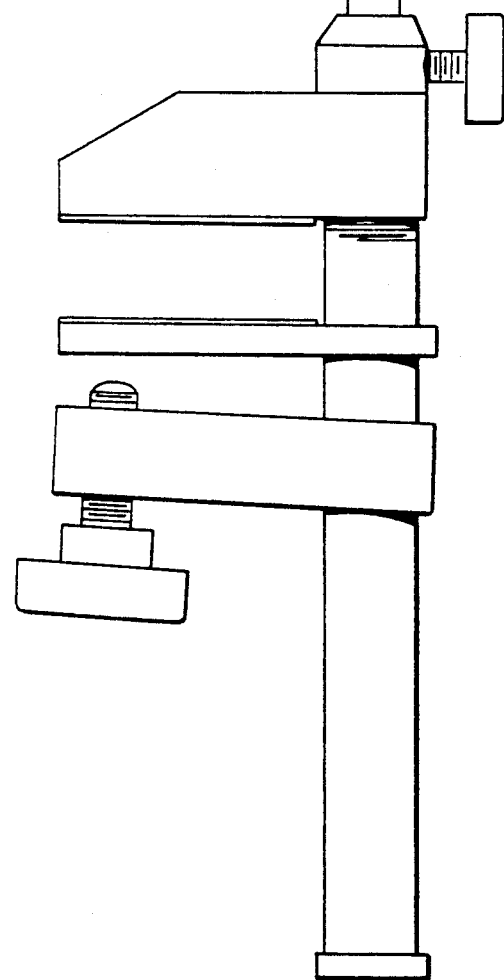

An overall view of a fly tying lathe embodying the principles of the present invention is shown in FIG. 1. The chuck 1 or jaws 61 and 62, which hold the work piece or hook, are pointed and are directly mounted into a housing sleeve or spindle 2. The spindle 2 is inserted into the body 50 and mounted for rotation about axis 51. The body 50 consists of a barrel support 9 and a barrel 6, press fit into the barrel support 9. The spindle 2 is mounted on a front bearing 5 and on a rear bearing 10. The spindle is prevented from longitudinal movement by a front retainer 3 and a rear retainer 11. The front retainer 3 surrounds and is fixed to the spindle 2 by a set screw 18 and separated from the front bearing 5 by a face washer 81. The rear retainer 11 surrounds and is fixed to the spindle 2 by a set screw 17 and separated from the rear bearing 10 by a face washer 82.

A fixed pin or spindle lock screw 8 is threadedly mounted on the barrel support 9 and is adapted to selectively engage a detent 83 of the spindle 2 when the screw is moved inward. The fly wheel or rotator 12 has a crank handle 13 attached to the wheel 12 by a crank arbor 14 and a crank handle screw 15, and is separated from the barrel 6. The wheel 12 is attached directly to a draw bar 7, which is mounted for rotation in the spindle 2. The wheel is mounted to the draw bar 7 by means of a roll pin 19.

The barrel support 9 has a downwardly directed tongue 52 which is pivotally mounted in a yoke 21. The yoke 21 is locked by a set screw 20 to a stem 30 which is inserted downward into a lower mounting assembly 53. The yoke 21 carries an adjustment knob or yoke lock screw 22 which controls the pivotal orientation of the tongue 52 with respect to the yoke 21. The stem enters the lower mounting assembly through the stem receiver 24, then passes through the stem tube 29, which is blocked at its end by tube plug 31. The ability of the stem to rotate in or slide up and down in the stem tube 29 is controlled by a stem tube lock 25 which is threaded into the stem receiver 24.

The lower mounting assembly 53 includes the tube subassembly 54 and the clamp subassembly 55. The tube subassembly includes the stem receiver 24, the stem lock screw 25, the stem tube 29, and the stem plug 31. The clamp subassembly includes a top clamp jaw 26, a float plate 27, a bottom clamp jaw 28, and a clamp screw 56 threadedly mounted in the bottom clamp jaw 28. The top clamp jaw 26 is rigidly mounted on the tube subassembly, while the float plate 27 and the bottom clamp jaw 28 are slidably mounted on the stem tube 29. The lower surface of the top clamp jaw 26 is covered with a nonabrasive upper facing 35, and the upper surface of the float plate is covered with a nonabrasive lower facing 36. The facings contact the bench top to which the vise will be mounted and protect the bench top from damage.

FIG. 2-6 show the various overall views of the vise shown in FIG. 1.

Figure 7:
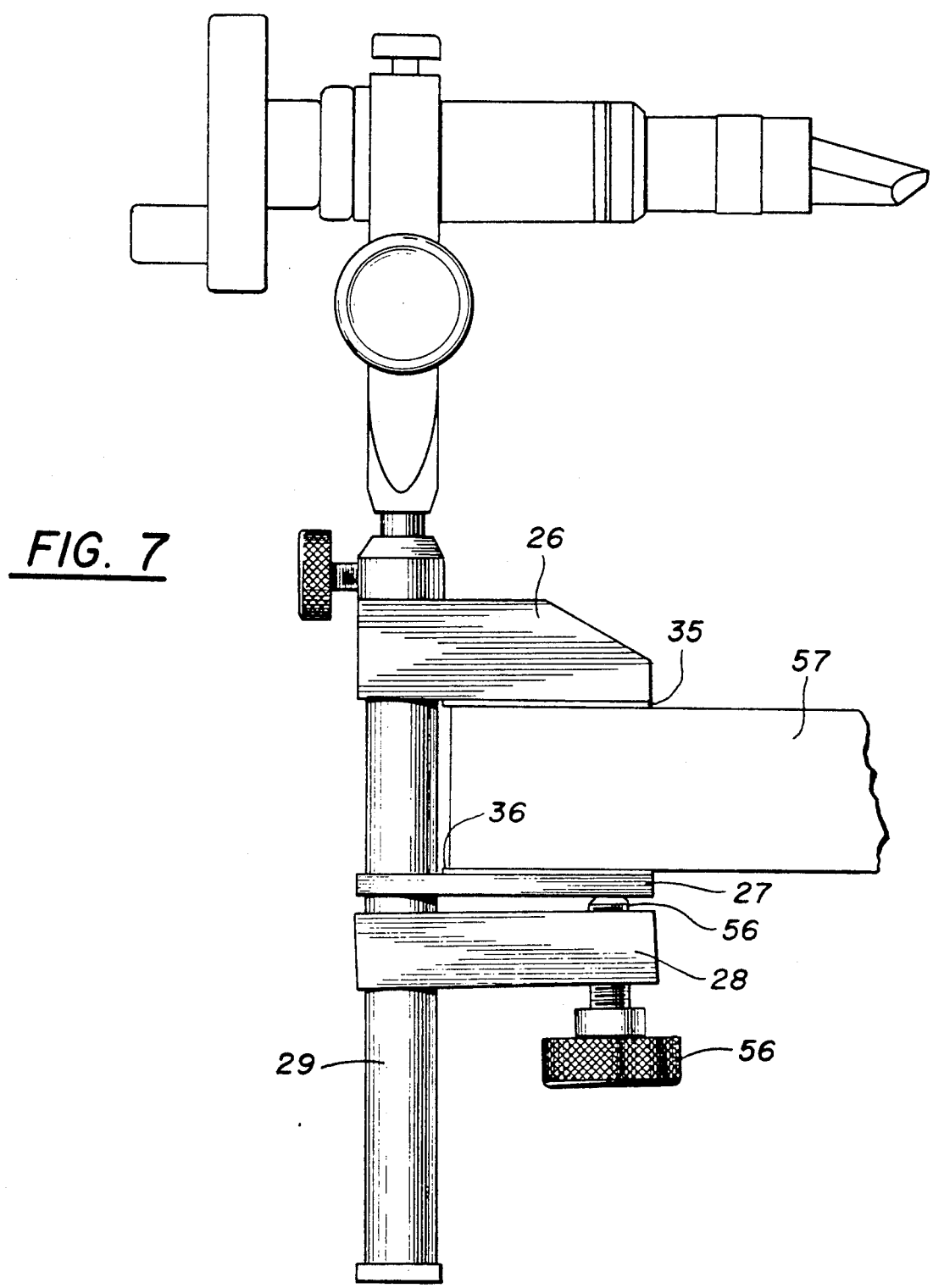

FIG. 7 shows the a front view of the vise as it would be mounted on a bench top 57. The lower surface of the top clamp jaw, acting through the upper facing 35, engages the upper surface of the bench top 57. The upper surface of the float plate 27 is slid along the stem tube 29 and, acting through the lower facing 36, is caused to engage the lower surface of the bench top 57. The bottom clamp jaw 28 is then slid up the stem tube 29 until the upper end of the clamp screw 56 engages a detent in the lower surface of the float plate 27. It is important that the lower clamp jaw 28 is loosely mounted on the stem tube 29, and, as it extends outward from the stem tube 29, it is canted upward at about 3 degrees from horizontal. Thus, when the clamp screw 56 is turned to tighten it against the float plate 27, the downward torque of the bottom clamp jaw against the stem tube 29, locks the bottom clamp jaw 28 against the stem tube 29, and prevents the bottom clamp jaw 28 from sliding along the stem tube 29. This allows the top clamp jaw 26 and the float plate 27 to clamp the vise to the bench top 57. Yet, simply unscrewing the clamp screw 56 easily releases the clamp. This system allows the clamp mechanism to be easily adjusted to a wide range of thicknesses of bench tops.

Figures 8, 9:
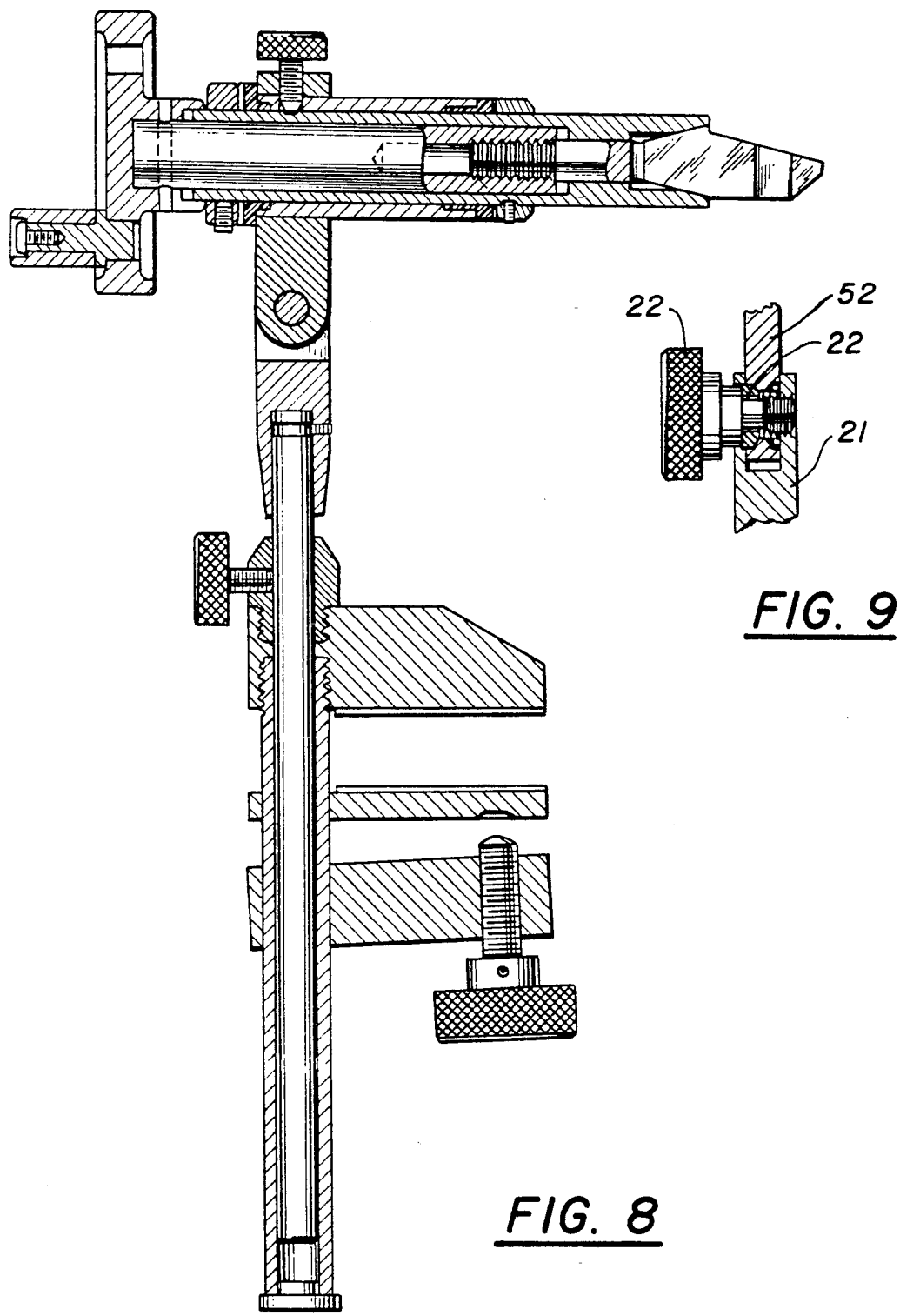

FIG. 8 is a cross-sectional view of the overall structure of the vise.

FIG. 9 is a sectional view showing the construction of the attitude adjustment means. The yoke lock screw 22 passes through one leg of the yoke 21, through the tongue 52 and is threaded into the other leg of the yoke 21. A formed lock washer 23 facilitates the selective locking together of the yoke 21 and tongue 52 by the screw 22.

Figure 10:
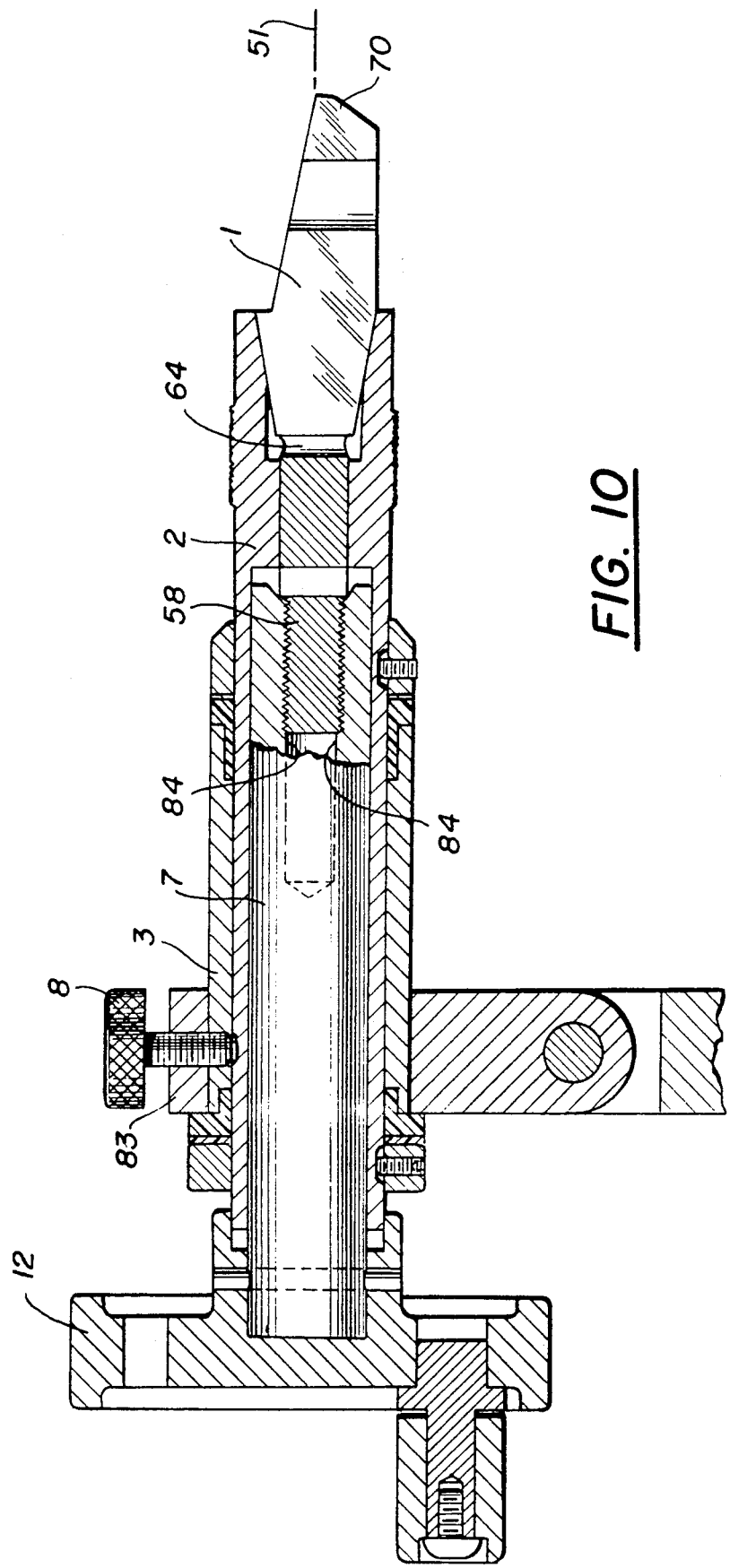

FIG. 10 shows close-up sectional view of the inside of the body 3 and the spindle 2. Within the spindle 2, the draw bar 7 is shown to threadedly engage a threaded shaft 58 extending from the chuck 1. When the spindle lock screw 8 is in its upper position so that it does not engage the spindle 2, rotation of the fly wheel cause rotation of the chuck 1 about the axis 51. This is because rotation of the chuck is not prevented by the axially-slidable connection of the chuck to the now rotatable spindle 2. When the spindle lock screw 8 is screwed downward, it engages a spherical detent 83 which is upwardly facing when the chuck 1 is in its normal position, as shown. This engagement stops the spindle from rotating relative to the body 3. This stops the chuck from rotating, because the chuck is mounted in the spindle for axial movement only. Thus, rotation of the draw bar 7 causes relative rotation between the threads 84 on the draw bar 7 and the threads on the threaded shaft 58. This causes axial movement of the chuck 1, which, in turn, causes opening or closing of the jaws of the chuck 1, depending on the direction of rotation of the wheel 12.

Figure 11:
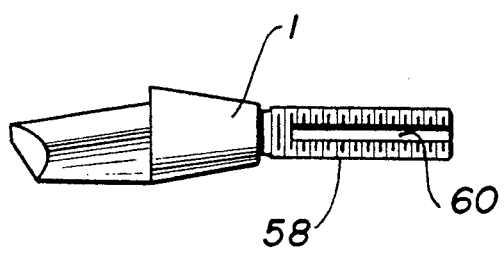
Figure 12:
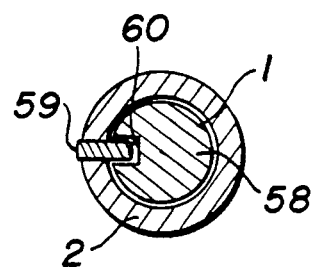

One important relationship in this vise is the axial-movement-only connection between the chuck 1 and the spindle 2. Referring to FIG. 11, the back side of the threaded shaft 58 of the chuck 1 is shown to have a slot or groove 60 cut along its length. This groove 60, as shown in FIG. 12, carries a pin 59, which extends inward from the inner wall of the spindle 2 and which slides along the groove 60, but prevents rotation of the chuck 1 in the spindle 2.

Figure 13:
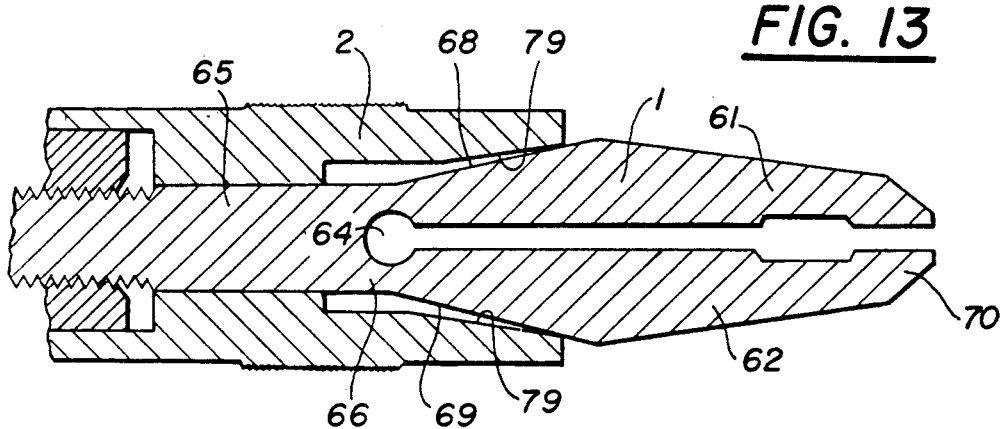
Figure 14:
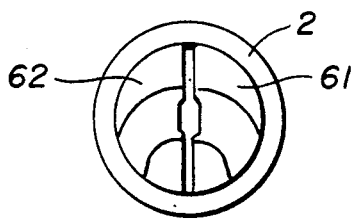
Figure 15:
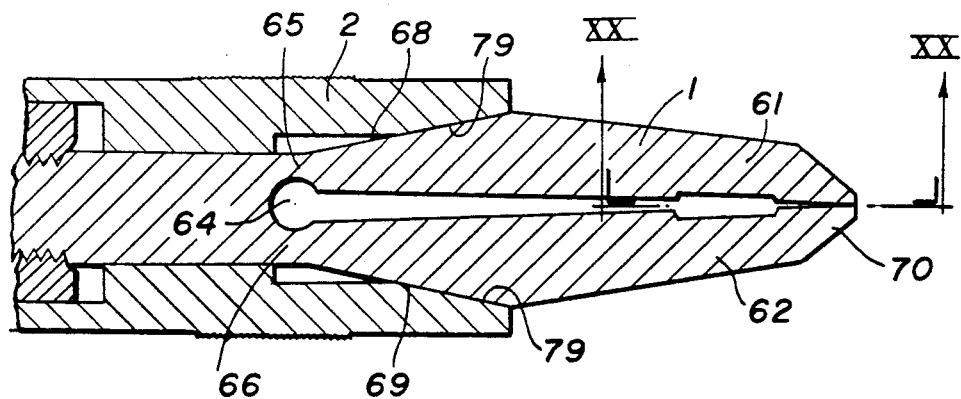

The actuation of the jaws 61 and 62 of the chuck 1, as the chuck 1 moves relative to the spindle is shown diagrammatically in FIGS. 13–16. Top views in FIGS. 13 and 15 are sectioned to show the chuck 1 in the spindle 2. FIG. 13 shows the chuck 1 in its open position, as it is extended outward from the right circular conic throat 78 of the spindle 2. The generatrix of the conic surface 79 of the conic throat 78 of the spindle 2 is 11 degrees off from the axis 51 of the spindle 2. The throat 78 of the spindle 2 engages cam surfaces 68 and 69 on the flanks of the chuck 1. That cam surfaces 68 and 69 is formed as a conic surface of 11 degrees off the axis with the jaws 61 and 62 held shut. Thus, when the jaws are in the open position, the generatrix of the conic cam surface takes on an oval path with the angle in the plane of the drawing being 13 degrees. FIG. 14 shows and end view of the jaws open.

Figure 16:
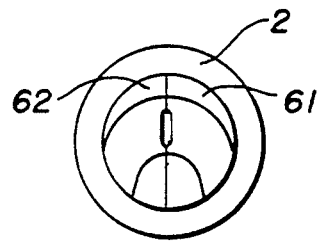

FIG. 15 shows that, as the chuck 1 is drawn into the throat of the spindle 2, the conic throat acts on the cam surfaces 68 and 69 of the chuck to cause the jaws 61 and 62 of the chuck, to close. FIG. 16 shows an end view of the closed jaws 61 and 62.

It is important to note that the end of the slot 67 between the jaws 61 and 62 is formed by a cylindrical bore 64 which passes through the center of the chuck. This bore 64 is positioned on the threaded shaft 58 and abuts the intersection of the threaded shaft 58 and the cam surfaces 68 and 69. This geometry has two very important effects. First, the radial thickness of each of the jaws is very much at its thinnest at this bore 64, except of course, for the portion immediately adjacent the chuck mouth. As a result, the flexure of the jaws 61 and 62, caused by the action of conic surface 79 on cam surfaces 68 and 69, occurs essentially exclusively at these hinge points 65 and 66 on each side of the bore 64. Thus, as the jaws come together, they contact along a line at the extreme outer edge of the chuck and focus the progressing force on that line. This allows the precise holding of even the smallest hooks. This would, of course, not be the case if the flexure of the jaws were allowed to occur along the length of the jaws, as they would bow and tend to open up at the extreme end of the chuck.

The focusing of force at the tip of the chuck, because of the rigidity of the jaws (except at the hinge points), would normally require that the mass of the jaws be carried and extended as close to the work end 70 of the chuck as possible. This, of course, would result in the blunt work end which characterizes prior art vises. This, of course, creates a conflict with the desirability of a long, finely pointed work end which would create a more observable and accessible presentation of the workpiece to the user.

The present invention resolves this conflict with a specially-shaped work end 70, which provides the superior working characteristics of a pointed work end with the rigidity and superior holding characteristics of a blunt work end.

In essence, when the chuck is in its normal work position, as shown in FIG. 1–6, the exposed chuck portion above the axis 51 has a finely pointed profile and the portion below the axis 51 has a blunt profile. This, of course, requires a transition zone on each side which involves sidewardly extending lobes along the length of the work end, slightly below the horizontal plane which includes the axis 51. These outwardly extending lobes are perfectly positioned to maximally stiffen the jaws while minimally obstructing access to the workpiece held in the chuck. The offset of the mass of the work end sideways and below the axis optimizes the work end characteristics of rigidity and access.

At this point, it is important to emphasize that this device is a precision machine and not a simple clamping vise. The chuck is designed in such a way that the point is on center line of spindle and delicate enough to hold a size 32 hook while still having good visibility and clearance. Yet, it is powerful enough to hold size 6/0 hook without the use of serrations or binding cavity. Thus, the smooth sided jaws will not damage hooks.

Another benefit of the bore 64 is that the hinging action takes place at smooth surfaces, that is, surfaces which are not primarily sharp corners or angles. The ongoing flexing of the prior art angled hinge points are found to induce crack formation and metal fatigue failure at angles, if they are near the hinge points. The lack of angles parallel to the axis of the hinge action essentially eliminates stress crack failure at the hinge points 65 and 66 of the present design.

Figure 17:
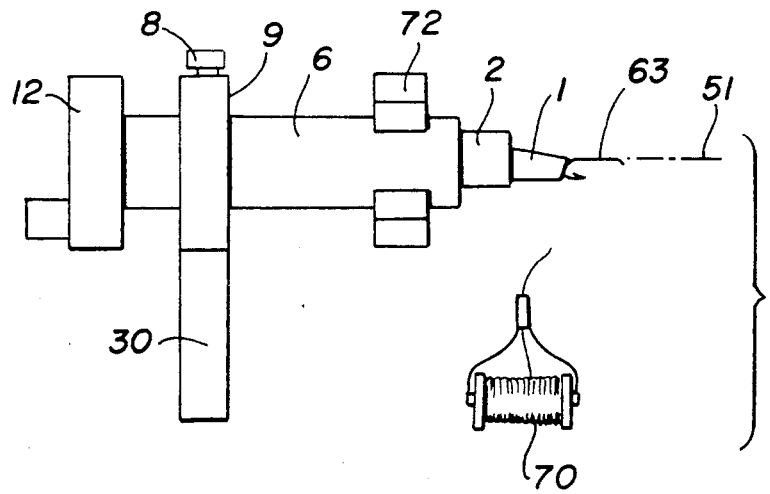
Figure 18:
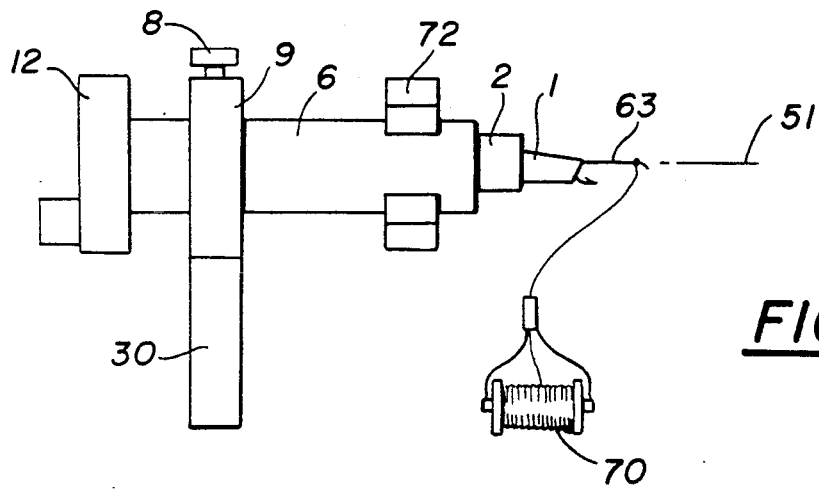
Figure 19:
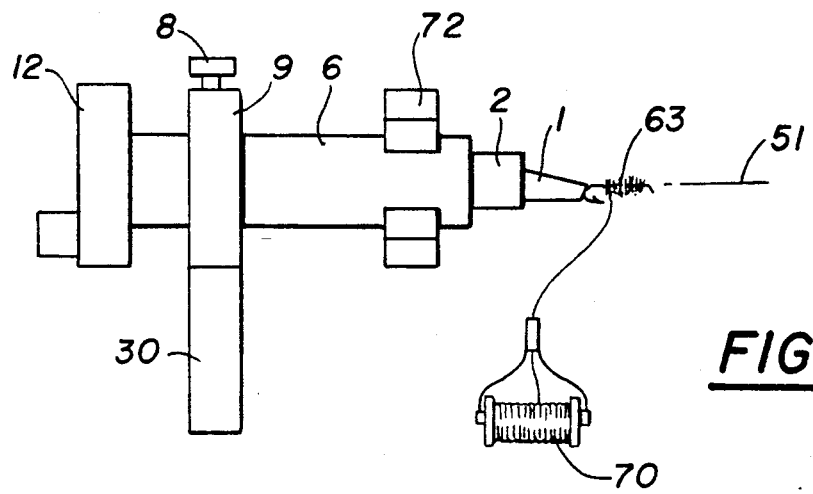

A typical manner in which the vise of the present invention might be used is shown diagrammatically in FIGS. 17–19. In FIG. 17, the spindle lock screw 8 is in its lower position and engages the detent on the spindle 2. This prevents the spindle 2 from rotating in the barrel 6. As a result, rotation of the fly wheel 12 in a counter-clock-wise manner causes counter-clock-wise rotation of the draw bar 7. Because the spindle is kept from rotating, the pin which engages the longitudinal groove in the chuck 1 keeps the chuck from rotating. As a result, the relative movement between the threads of the draw bar 7 and the threads on the threaded shaft 58 of the chuck 1 causes the chuck 1 to move out of the conic throat of the spindle 2. This allows the jaws 61 and 62 of the chuck to spread apart, ready to receive the work piece.

The workpiece, typically a fish hook 63 of the type used in fly tying, is then placed between the jaws 61 and 62 of the chuck 1. The hook is placed with its shape or bye between the jaws 61 and 62, its point extending out of the bulbous, lower portion of the chuck 1, its shank along the axis 51 of the spindle 2, its eye away from the chuck 1. With the hook held in this position by the operator's hand, the fly wheel 12 is rotated clock-wise, which causes the draw bar 7 to rotate clock-wise. The threads of the draw bar 7 act on the threaded shaft of the non-rotating chuck 1 to draw the chuck into the conic throat of the spindle 2. The conic surface of the throat acts on the cam surfaces of the chuck to cause the jaws of the chuck to close on and hold the hook, as the chuck 1 is drawn into the throat 78 of the spindle 2. At this point, the hook is firmly held in the chuck with the shank of the hook coaxial with the axis of the spindle, as shown in FIG. 17.

As shown in FIG. 18, the spindle lock screw 8 is now moved to its upper position in which it does not engage the spindle 2. This allows the spindle 2 to freely rotate in the barrel 6. When the fly wheel 12 is rotated, causing the draw bar 7 to rotate, the back torque of the chuck, acting against the pin in the barrel, prevents relative rotation between the draw bar 7 and the threaded shaft 58 of the chuck 1. Because the spindle is no longer restrained by the spindle lock screw 8, torque on the chuck 1, pin 59, and spindle 2 is allowed to cause the chuck 1 to rotate. This causes the shank of the hook to rotate on the axis of the spindle with little or no wobble.

As shown in FIG. 18, the operator might, typically, tie the free end of a spool 70 of fly tying thread to the head portion (just behind the eye) of the hook and, without moving the thread along the shank, rotate the fly wheel.

As shown in FIG. 19, the thread will accumulate on the hook to easily and quickly form a bulbous head. Then, as the operator guides the thread along the shank, while simultaneous rotating the fly wheel, a layer of thread can be quickly and easily helically laid on the length of the shank to form the body of the fly.

This operation of laying-on layers of thread or other elongated dressing onto the hook shaft brings another important aspect of the present invention into focus. It has been found that this operation can be much more effectively and easily conducted if the user has not only precise control over the speed and angle of the rotation of the hook shaft, but also precise control of the consistency of the speed of rotation. The designers of prior art vises apparently did not recognize the importance of these characteristics, so that prior art vises do not address these characteristics.

The present design achieves these characteristics by the combination of a number of design elements. First, except when the fixed pin is used to stop or resist rotation, the design of the vise, and especially the bearings which support the sleeve in the barrel allow smooth rotation with low and consistent resistance to rotation. Second, the shape of the wheel 12, and especially the cylindrical fingering surface 85 which is axially symmetric about the axis 51 of the vise, allows the user to impart precise and consistent rotation to the vise. The aspect is enhanced by the knurling on the fingering surface 85 which gives the user's fingers precise and consistent control over the rotation of the wheel 12. This aspect is also enhanced by the relatively high peripheral mass of the wheel, which adds a fly-wheel effect to the rotation and thereby aids in consistent rotation. The fly-wheel effect is enhanced by the concentration of the mass of the wheel at its periphery. The periphery has an enlarged axial thickness, while the radial interior of the wheel has a reduced axial thickness and a series of bores which further reduce the mass of the non-peripheral portion of the wheel. By designing the wheel in this manner, the fly-wheel action is maximized while minimizing the necessary total mass of the wheel. This consistent peripheral mass is not effectively disturbed by the contribution of the crank handle 13, which is of relatively low mass and which is positioned inward of the peripheral of the wheel 12. As a result, the user on impact and consistent and precisely speed-controlled rotation to the work shank and thereby achieve a lathe action which allows precise and eased application of layers of dressing along the length of the shaft.

Figure 21:
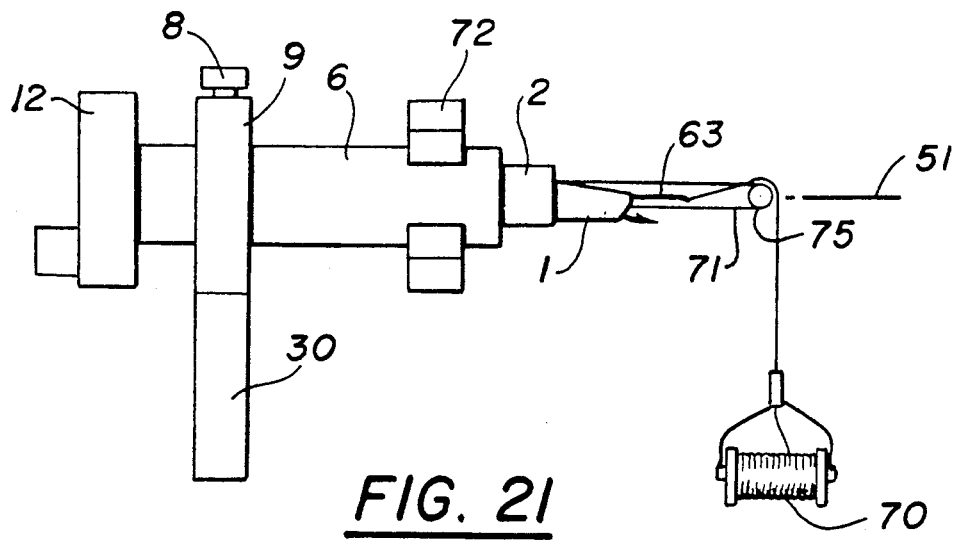
Figure 22:
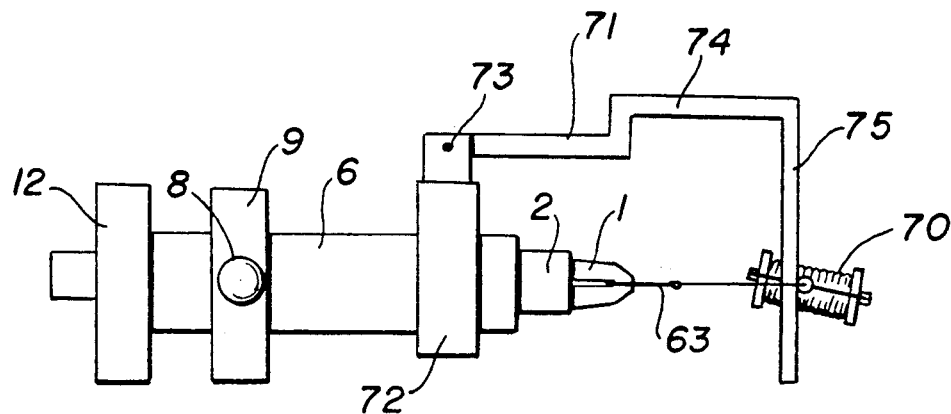

FIGS. 21-22 introduce an accessory which adds to the convenience of the vise, namely, a bobbin rest 71. This optional device and procedure can be used between the operations shown in FIG. 17 and FIG. 18. In this procedure, the active portion of bobbin support 71, which is pivoted back and out of sight in FIG. 18 (except for the clip 72), is pivoted into its active position as shown in FIG. 21 and 22. FIG. 21 is a front elevation view similar to FIG. 18. FIG. 22 is a plan view looking down on the top of the vise.

As can be seen in FIG. 22, the bobbin rest 71 has a clip 72 which allows the rest to be selectively fastened to the non-rotating barrel 6 of the vise. Pivotally mounted to the clip 72 by a hinge 73 is a bale 74 which extends along and out from the chuck 1 and presents a support bar 75. The support bar 75 is adapted to hold the thread and spool 70 out away from the hook horizontally and radially across the axis 51. This optional device free the operator to focus on positioning the thread during the winding operation. As shown in FIG. 21, the thread would extend from the point where it is fastened to the hook 63, substantially along axis 51, over the support bar 75, and down to the spool 70. The fact that the thread closely follows the axis 51 allows the shank of the hook 63 to be rotated by the vise without interference by the thread, when the equipment is arranged as in FIGS. 21 and 22.

As will be recognized by those skilled in the art of fly tying, the above technique can be used to apply a vast array of materials including threads, dubbed threads, yarns, tinsel, chenille, feathers, fur, hair, and synthetics. Furthermore, the ability to rotate the workpiece about the axis of the spindle allows the operator to present the workpiece in the orientation in which he can most conveniently apply special dressings such as wings, tails, legs, cheeks, tips, and antennae. The ability to control the orientation of the workpiece is particularly useful in such operations as annular cutting down of the deer hair head of such flies as the muddler minnow. When the user has selected a specific rotation position, the spindle lock screw 8 can be moved inward to engage the spindle 2 and thereby to hold the spindle against rotation. This effect will not be a locking action as would occur when the sleeve is in the normal position and wherein the screw 8 engages the detent. Nevertheless, the friction of the screw on the sleeve surface is ordinarily sufficient to selectively stop the rotation of the sleeve during hook dressing.

Figure 20:
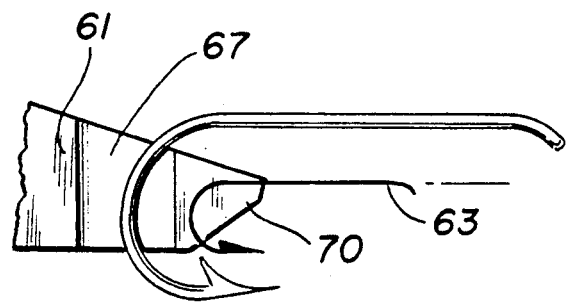

Occasionally, the operator may wish to work on a hook which is too large to be held effectively using the normal approach. As can be seen in the various views, in addition to the diametric slot which separates the jaws and extend to a bore in the threaded shaft of the chuck 1, there is an enlarged slot 67 which extends from top to bottom between the jaws. The large hook can be held very effectively between the jaws in the slot 67 as shown in FIG. 20. This slot 67 can also conveniently be used temporarily to hold material extending from the work piece out of the user's way until the material is needed. The free end of the material can be simply stuffed into the slot 67.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

1. A rotatable vise for holding small objects which comprises:
   (a) mounting means for attaching the vise to a fixed support,
   (b) a body attached to the mounting means, (c) a freely rotatable sleeve mounted in the body means, said sleeve having a longitudinal axis about which it rotates, (d) a draw bar, rotatably mounted in the sleeve, and having a first threaded element, (e) a rotatable hub mounted on one end of the draw bar, so that when said hub is rotated in either direction, the draw bar will take on said rotation, (f) sleeve engagement means which can be transferred back and forth between a first state which allows rotation of the sleeve within the body and a second state which prevents rotation of the sleeve within the body, (g) an object clamping means, mounted in the sleeve for axial motion relative to the sleeve but not rotational motion relative to the sleeve, said clamping means having a second threaded element which threadedly engages said first threaded element, and (h) a thread spool holder attached to said body and adapted to supply support to hold the fly thread when tying.

2. The vise of claim 1, in which the clamping means has a groove in the jaws as a means to secure the hook when the jaws are closed.

3. The vise of claim 1, in which the clamping means has its greatest diameter at its midsection and said clamping means tapers to a point.

4. The vise of claim 1, which the rotatable hub has a knob as means to supply torque by a user to the hub.

5. The vise of claim 1, the sleeve engagement means is mounted on the body and engages a detent on the sleeve.

6. The vise of claim 1, in which the mounting means is a vise which may clamp to a fixed support.

7. The vise of claim 6, in which the mounting means uses a fixed plate to engage one surface of the fixed support, a floating plate which engages a second surface of the fixed support, and a fixable plate which can be fixed to a distance from the fixed plate and is adapted to bias the floating plate against the said second surface.

8. The vise of claim 1, in which the mounting means may clamp to a fixed support and is tightened by means of a screw which is below the fixed support.

9. A vise as in claim 1, in which the body means has a height adjustment means to increase the distance between the clamping means and said mounting means.

10. A vise as in claimed in claim 1, in which said body has an attitude adjustment means to provide horizontal angle adjustment means for the clamping means.

11. A rotatable vise for holding small objects which comprises:

(a) mounting means for attaching the vise to a fixed support, (b) a body attached to the mounting means, (c) a freely rotatable sleeve mounted in the body means, said sleeve having a longitudinal axis about which it rotates, (d) a draw bar, rotatably mounted in the sleeve, and having a first threaded element, (e) a rotatable hub mounted on one end of the draw bar, so that when said hub is rotated in either direction, the draw bar will take on said rotation, (f) sleeve engagement means which can be transferred back and forth between a first state which allows rotation of the sleeve within the body and a second state which prevents rotation of the sleeve within the body and locks the sleeve in a specific orientation with respect to the body, said engagement including a convex element and a concave element, said elements being mutually engageable and one of said elements being on the body and the other of said elements being on the sleeve, and (g) an object clamping means, mounted in the sleeve for axial motion relative to the sleeve but not rotational motion relative to the sleeve, said clamping means having a second threaded element which threadedly engages said first threaded element.

12. A rotatable vise for holding small objects which comprises:

(a) mounting means for attaching the vise to a fixed support, (b) a body attached to the mounting means, (c) a freely rotatable sleeve mounted in the body means, said sleeve having a longitudinal axis about which it rotates, longitudinal axis about which it rotates, (d) a draw bar, rotatably mounted in the sleeve, and having a first threaded element, (e) a rotatable hub mounted on one end of the draw bar, so that the said hub is rotated in either direction, the draw bar will take on said rotation, (f) sleeve engagement means which can be transferred back and forth between a first state which allows rotation of the sleeve within the body and a second state which prevents rotation of the sleeve within the body, (g) an object clamping means, mounted in the sleeve for axial motion relative to the sleeve but not rotational motion relative to the sleeve, said clamping means having a second threaded element which threadedly engages said first threaded element, said clamping means having a clamp comprised of a first jaw and a second jaw, each of said jaws having a point adjacent the axis and which is the part of each jaw most distant from the sleeve, the jaws being symmetric to each other with respect to a first plane which includes the said axis, but asymmetric with respect to a second plane which includes the axis and is perpendicular to the first plane, the said asymmetry including the fact that the mass of jaw materials on one side of the second plane is less than the mass of jaw materials on the second side of the second plane, so that the lesser mass of jaw material on the said one side of the second plane maximizes the visibility of a workpiece in the jaws whereas the greater mass of the jaw material on the said second side of the second plane maximizes the rigidity of the jaws.

* * * * *